Patented Aug. 29, 1950

2,520,381

UNITED STATES PATENT OFFICE 2,520,381

CONDENSATION OF ETHYLENE OXIDE WITH CARBOXYLIC ACID AMIDES

Joseph J. Carnes, Greenwich, Conn., assignor to American Cyanamid Company, New York, N. Y., a corporation of Maine No Drawing. Application June 18, 1946, Serial No. 677,523

4 Claims. (Cl. 260—404)

This invention relates to an improved method for the condensation of ethylene oxide with amides of organic carboxylic acids. It is a principal object of the invention to provide a method whereby condensation products of ethylene oxide with organic carboxylic acid amides can be obtained in relatively short times without the use of superatmospheric pressures.

It is known that a wide variety of non-ionic and cationic surface-active agents can be obtained by condensing at least 6 mols of ethylene oxide with reactive organic carboxylic acid amides; i. e., with amides which contain a replaceable hydrogen attached to an amido nitrogen or to an alkoxy group, as in the organic carboxylic acid alkylol amides. This reaction is described, for example, in U. S. Patent No. 2,085,706.

Heretofore it has always been considered necessary to carry out the condensation of ethylene oxide with reactive organic carboxylic acid amides at superatmospheric pressures. This was considered necessary because experience had shown that under those conditions known to the art the requisite quantities of ethylene oxide would not combine with the amide at ordinary atmospheric pressures, even when alkaline condensation catalysts such as sodium hydroxide or sodium alcoholate were used. The necessity of employing high pressures in this reaction created an unusually severe industrial hazard, for ethylene oxide is a very explosive gas. Moreover, ethylene oxide-air mixtures are explosive throughout an extremely wide range; i. e., the presence of even small quantities of air in an autoclave in which ethylene oxide is being reacted at superatmospheric pressures is very likely to cause a severe explosion. Accordingly, there has been a definite need in industry for a process in which ethylene oxide can be combined with aliphatic carboxylic acid amides without the use of superatmospheric pressures.

The present invention is based on the discovery that ethylene oxide can be condensed with reactive organic carboxylic acid amides in quantities sufficient to produce polyethenoxy derivatives at substantially atmospheric pressures, and without the use of autoclave or other pressure vessels, when the reaction is carried out in a polar solvent and in the presence of an alkaline condensation catalyst. Under these conditions the condensation reaction proceeds smoothly and rapidly, with the formation of water-soluble or water-dispersible polyethenoxy derivatives of organic carboxylic acid amides within a few hours. My invention in its broader aspects therefore consist in reacting ethylene oxide with an organic carboxylic acid amide by passing ethylene oxide gas into a solution of a reactive organic carboxylic acid amide in a polar solvent, which is preferably an alcohol and continuing the introduction of ethylene oxide until at least 4 and preferably from 6–7 to 200 mols of ethylene oxide has reacted. By using a volatile alcohol such as ethanol, propanol or isopropanol or one of the butanols, the temperature of the condensation reaction is easily controlled, merely by maintaining the solution at its boiling point and operating in a reaction vessel surmounted by a reflux condenser, the top of which is open to the atmosphere.

Although any alkaline condensation catalyst may be used in practicing the process of the invention, improved results are obtained by the use of alkylamine condensation catalysts, and particularly by using the lower aliphatic amines such as mono-, di- or triethylamine or the corresponding propyl- or butylamines i. e. primary, secondary or tertiary amines in which no alkyl radical contains more than 4 carbon atoms. When a primary or secondary aliphatic amine is used as catalyst it is probable that it combines with some of the ethylene oxide to form a tertiary amine; therefore, the tertiary aliphatic amines are probably the effective condensation catalysts in all cases. However, it is evident that any lower aliphatic amines may be added as a starting material, and the use of this type of catalyst constitutes another important feature of the invention.

The amount of catalyst may vary within the relatively wide limits of about 3–30% of the organic carboxylic acid amide to be reacted. Within this range I have obtained optimum results when using about 5–15% of triethylamine or diisopropylamine in condensing ethylene oxide with alkylol amides of higher fatty acids such as coconut fatty acids, stearic acid, oleic acid and the like. Somewhat larger quantities are used with less reactive organic carboxylic acid amides, such as with lauroylcarbamylguanidine. Lower quantities may be used with amides of organic dicarboxylic acids.

The process of my invention is of particular value in preparing non-ionic surface-active agents by reacting ethylene oxide with organic carboxylic acid alkylol amides such, for example, as the monoamides obtained by heating monoethanolamine, diethanolamine, or the corresponding mono- or dipropanolamines or mono- or dibutanolamines with higher fatty acids such as those of 10–18 carbon atoms obtained by the saponification of triglyceride oils and fats. In preparing water-soluble or water-dispersible surface-active agents from these alkylol amides I may react from about 4 mols to about 200 mols or more of ethylene oxide for each mol of the fatty acid alkylol amide by the process of my invention; i. e., by dissolving the fatty acid alkylol amide in a volatile alcohol together with an alkaline condensation catalyst and passing in ethylene oxide while maintaining the solution at its boiling point. By selecting an alcohol or mixture of alcohols having the desired boiling point or reflux temperature the temperature of the reaction mixture may be maintained at its optimum value.

In addition to the advantages obtained by operating at atmospheric pressures, and thereby avoiding explosion hazards and other difficulties attendant upon the use of autoclaves, a further extremely important advantage is obtained by the process of my invention. This further advantage is the fact that the ethylene oxide condensation can be carried out rapidly at much lower temperatures in a polar solvent such as a lower aliphatic alcohol than when other solvents, or no solvent at all, are used. Thus, I have condensed ethylene oxide with higher fatty acid ethanol amides dissolved in lower aliphatic alcohols at temperatures as low as 45° C., and my preferred operating range for this type of reaction is about 65°–95° C. By carrying out the condensation reaction in alcohol solution I am therefore able to operate at temperatures below the boiling point of water, which greatly simplifies the equipment necessary for the reaction.

It will be noted that the present invention is directed particularly to the production of polyethenoxy derivatives of amides of organic carboxylic acids having at least 6 and preferably 10–18 carbon atoms, these polyethenoxy derivatives containing at least 4 and preferably 6 or more ethenoxy groups as described in U. S. Patent No. 2,085,706. The manufacture of this class of compounds (i. e., compounds in which more than one mole of ethylene oxide is combined for each reactive hydrogen) has heretofore required the use of elevated temperatures and superatmospheric pressures to obtain the requisite quantities of combined ethylene oxide. The present invention avoids this requirement and permits the production of these known surface-active agents by a much simpler process.

The invention will be further illustrated by the following specific examples. It should be understood, however, that although these examples may describe in detail certain specific features of the invention, they are given primarily for purposes of illustration and the invention in its broader aspects is not limited thereto.

*Example 1*

Ethylene oxide was introduced at atmospheric pressure into a solution of 200 grams (.61 mol) of monoethanolstearamide and 20 cc. of triethylamine in 200 cc. of tertiary butanol at 70°–80° C., using the apparatus described in Example 3. The initial gas absorption was very rapid, 90 grams being taken up during the first two hours. After 6 hours a total of 345 grams (7.85 mols) of ethylene oxide were absorbed, whereupon the gas was shut off, the solution filtered at 70° C., and stripped of triethylamine and t-butanol by heating at 120° C. under reduced pressure. The product was a red oil which solidified to a tan wax on cooling, soluble in water to a clear yellow 10% solution. It contained 12.7 mols of combined ethylene oxide per mol of ethanolstearamide.

*Example 2*

The monoethanolamide of coconut fatty acids was prepared by refluxing a xylene solution containing equimolecular quantities of monoethanolamine of coconut fatty acids while removing the water formed by the reaction, followed by distillation of the solvent.

A mixture of 600 grams (2.36 mols) of the amide and 43.7 grams of triethylamine in 600 cc. of tertiary butanol was heated to 70°–75° C. under a reflux condenser and ethylene oxide was passed in under atmospheric pressure. 942 grams of ethylene oxide were absorbed during 7 hours after which the t-butanol and triethylamine were removed by vacuum distillation. The product, a dark red oil, was soluble in water and possessed wetting and emulsifying properties. It contained 9.1 mols of combined ethylene oxide for each mol of the amide.

*Example 3*

A solution of 840 grams (1.5 mols) of the dimerized coconut oil fatty acids sold commercially and 321 grams of diethanolamine in 550 cc. of xylene was heated under reflux at 135°–145° C. for about 12 hours while stripping out water from the distillate and returning the xylene. After 66 cc. of water were collected the xylene was removed by distillation under reduced pressure at about 160° C. The product, a dark brown, very viscous oil, weighed 1,107 grams and was the bis-diethanolamide of dimerized cottonseed fatty acids.

A 250-gram portion of the product was mixed with 200 cc. of tertiary butanol and 10 cc. of triethylamine in a flask fitted with a stirrer, thermometer, gas inlet tube extending below the liquid level, and a reflux condenser through which ice water was circulated. Ethylene oxide was passed into the solution at 70°–85° C. during 7 hours, after which time 243 grams were absorbed. Refluxing was continued for an additional 2 hours, after which the solvent was stripped off by heating at reduced pressure. The product weighed 485 grams, and was a dark brown, oily liquid soluble in water to a clear yellow, foaming solution. It contained 16 mols of combined ethylene oxide for each mol of dimerized fatty acid diamide.

*Example 4*

0.88 gram mols of lauric acid are mixed with 9.1 gram mols of sulfuric acid containing 3% of dissolved $SO_3$ and 1 gram mol of dicyandiamide, preferably in a finely divided state, is added slowly and with vigorous stirring so that it remains in contact with the sulfuric acid for only a short time prior to its reaction with the lauric acid. During addition of the dicyandiamide the temperature of the mixture is maintained at 20°–30° C. by positive cooling, if necessary, and the agitation is continued at this temperature after the dicyandiamide has all been added until no further heat is evolved. The mixture is then poured into cracked ice so that a precipitate of the lauroylcarbamylguanidine sulfate is formed. The solid product is filtered and washed thoroughly with water and acetone to remove any unreacted lauric acid, after which it is suspended in methanol and treated with a slight excess of ammonia. After vigorous stirring and cooling in an ice bath the mixture is diluted with water and filtered, whereupon lauroylcarbamylguanidine is obtained as a product melting at 220° C.

28 grams of the lauroylcarbamylguanidine were suspended in a mixture of 100 cc. of tertiary butanol and 12 cc. of triethylamine and heated to 65°–75° C. under a reflux condenser supplied with ice-cold water. Ethylene oxide was bubbled through this slurry at atmospheric pressure. After a short time the mixture became clear, and when 46 grams of ethylene oxide had been absorbed the passage of gas was discontinued. This required about 6 hours. The reaction mixture was then refluxed for an additional hour, during which time the temperature rose to 88° C., after which the tertiary butanol and triethylamine were removed by distilling at reduced pressure. The product, a tan, viscous liquid, was soluble in water and possessed good dispersing and emulsifying properties. It contained 10 mols of combined ethylene oxide per mol of amide.

*Example 5*

A solution of 100 grams of ethanolstearamide and 15 cc. of triethylamine in 80 grams (1.08 mols) of secondary butanol was heated to 90° C. in a flask fitted with a reflux condenser and ethylene oxide gas was passed in. This was continued at about 90°–95° C. for a total reaction time of about 1.5 hours, after which time 100 grams of ethylene oxide had been absorbed. The mixture was heated for an additional 1-hour period at reflux temperature and the solvent was stripped off in the usual manner. The product, weighing 193 grams, contained 6.9 mols of ethylene oxide per mol of ethanolstearamide.

*Example 6*

A mixture of 100 grams of ethanolstearamide and 15 cc. of diisopropylamine was dissolved in 90 cc. of tertiary butanol and reacted with ethylene oxide as in the preceding example for about 4 hours at 80°–90° C. A total of 150 grams of ethylene oxide was absorbed. After heating and removing the solvent there was obtained 250 grams of a product containing 11 mols of ethylene oxide per mol of ethanolstearamide.

*Example 7*

A mixture of 200 grams (0.616 mol) of ethanolstearamide and 1.4 grams of metallic sodium was dissolved by heating in 200 cc. of secondary butanol. The resulting solution, containing sodium butoxide as condensation catalyst, was heated to 95° C. in a flask equipped with a stirrer and reflux condenser and ethylene oxide gas was passed in while maintaining the top of the condenser open to the atmosphere.

The absorption of ethylene oxide by the solution was quite rapid, and 120 grams were taken up during 3 hours of reaction at 85°–92° C. At this point the introduction of gas was stopped and the mixture was heated under reflux at 95°–100° C. for an additional 30 minutes, after which the butanol was stripped off by heating at 125° C. under reduced pressure. The product, which weighed 313 grams, was a dark brown turbid liquid that solidified on cooling to a light brown wax. It contained 4.1 mols of combined ethylene oxide per mol of stearamide.

*Example 8*

A mixture of 200 grams (0.61 mol) of monoethanolstearamide and 15 cc. of triethylamine in 400 cc. of benzene was heated to 70°–75° C. in a flask fitted with a stirrer, gas inlet tube and condenser through which ice water was circulated. Ethylene oxide was passed in while maintaining the solution under slow reflux for a total of 14 hours, after which time a total of 224 grams (5.1 mols) of ethylene oxide were absorbed. Heating and stirring were continued at about the same temperature without further ethylene oxide addition for another 10 hours after which the benzene and triethylamine were removed by distillation at reduced pressure. The remaining ethylene oxide condensation product was soluble in benzene, xylene and in dimethyl phthalate and formed cloudy aqueous solutions that foamed on shaking. It contained 8.35 mols of combined ethylene oxide per mol of amide.

*Example 9*

A mixture of 200 grams of ethanolstearamide and 15 cc. of triethylamine was added to 200 cc. of dioxane and the mixture was heated to 80° C. Ethylene oxide gas was bubbled through under a reflux condenser for a total of 43 hours while maintaining approximately the same temperature. A total of 400 grams of ethylene oxide were absorbed during this period. The flow of ethylene oxide was then shut off and the refluxing continued for an additional 1.5 hours, after which the solvent was removed by distillation at reduced pressure. The product, weighing 600 grams, was a light tan wax containing 14.8 mols of combined ethylene oxide for each mol of the amide.

A comparison of Examples 8 and 9 with the preceding examples shows clearly the importance of the presence of a lower aliphatic alcohol when carrying out the ethylene oxide condensation at atmospheric pressure.

What I claim is:

1. A method of producing polyethenoxy derivatives of organic carboxylic acid alkanolamides which comprises passing ethylene oxide into a boiling solution of an organic carboxylic acid amide of an alkanolamine selected from the group consisting of the mono- and di- ethanolamines, propanolamines and butanolamines in a volatile aliphatic alcohol having dissolved therein from 3% to 30%, based on the weight of the amide, of an alkaline condensation catalyst and continuing the introduction of ethylene oxide until a polyethenoxy derivative of the organic carboxylic acid alkanolamide containing from 4 to 200 mols of combined ethylene oxide per mol of amide has been formed while maintaining said solution at atmospheric pressure.

2. A method according to claim 1 in which the solvent is a member of the group consisting of secondary butanol and tertiary butanol.

3. A method of producing polyethenoxy derivatives of fatty acid alkanolamides which comprises passing ethylene oxide into a boiling solution of the acid amide of a fatty acid of 10–18 carbon atoms with an alkanolamide selected from the group consisting of the mono- and di- ethanolamines, propanolamines and butanolamines in a volatile aliphatic alcohol having dissolved therein from 3% to 30%, based on the weight of the amide, of an alkaline condensation catalyst and continuing the introduction of ethylene oxide until a polyethenoxy derivative of the fatty acid alkanolamide containing from 4 to 200 mols of combined ethylene oxide per mol of amide has been formed while maintaining said solution at atmospheric pressure.

4. A method according to claim 3 in which the solvent is a member of the group consisting of secondary butanol and tertiary butanol.

JOSEPH J. CARNES.

REFERENCES CITED

The following references are of record in the file of this patent:

UNITED STATES PATENTS

| Number | Name | Date |
| --- | --- | --- |
| 1,952,008 | Bruson | Mar. 20, 1934 |
| 2,002,613 | Orthner et al. | May 28, 1935 |
| 2,085,706 | Schoeller et al. | June 29, 1937 |
| 2,131,142 | Orthner et al. | Sept. 27, 1938 |
| 2,357,283 | Peters | Sept. 5, 1944 |